(12) United States Patent
Nagori et al.

(10) Patent No.: US 12,243,300 B2
(45) Date of Patent: Mar. 4, 2025

(54) EFFICIENT OBJECT DETECTION USING DEEP LEARNING TECHNIQUES

(71) Applicant: TEXAS INSTRUMENTS INCORPORATED, Dallas, TX (US)

(72) Inventors: Soyeb Nagori, Bangalore (IN); Deepak Poddar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 17/512,049

(22) Filed: Oct. 27, 2021

(65) Prior Publication Data
US 2022/0147748 A1 May 12, 2022

(30) Foreign Application Priority Data
Nov. 12, 2020 (IN) .............................. 202041049581

(51) Int. Cl.
*G06V 10/25* (2022.01)
*G06N 3/048* (2023.01)
*G06V 10/94* (2022.01)

(52) U.S. Cl.
CPC ............ *G06V 10/95* (2022.01); *G06N 3/048* (2023.01); *G06V 10/25* (2022.01)

(58) Field of Classification Search
None
See application file for complete search history.

(56) References Cited

U.S. PATENT DOCUMENTS

| | | | |
|---|---|---|---|
| 10,452,960 B1 * | 10/2019 | Li | G06N 3/08 |
| 11,106,903 B1 * | 8/2021 | Huynh | G06V 10/82 |
| 2018/0032840 A1 * | 2/2018 | Yu | G06V 10/774 |
| 2018/0089505 A1 * | 3/2018 | El-Khamy | H01L 27/146 |
| 2019/0172224 A1 * | 6/2019 | Vajda | G06N 3/045 |
| 2020/0258313 A1 * | 8/2020 | Chen | G06T 7/73 |
| 2022/0343641 A1 * | 10/2022 | Runge | G06N 3/045 |

FOREIGN PATENT DOCUMENTS

WO WO-2022035787 A1 * 2/2022 ............ G06F 17/18

* cited by examiner

*Primary Examiner* — Idowu O Osifade
(74) *Attorney, Agent, or Firm* — Xianghui Huang; Frank D. Cimino

(57) ABSTRACT

Various embodiments of the present technology relate to using neural networks to detect objects in images. More specifically, some embodiments relate to the reduction of computational analysis regarding object detection via neural networks. In an embodiment, a method of performing object detection is provided. The method comprises determining, via a convolution neural network, at least a classification of an image, wherein the classification corresponds to an object in the image and comprises location vectors corresponding to pixels of the image. The method also comprises, for at least a location vector of the location vectors, obtaining a confidence level, wherein the confidence level represents a probability of the object being present at the location vector, and calculating an upper-bound score based at least on the confidence level. The method further comprises, for at least an upper-bound score based at least on the confidence level, performing an activation function on the upper-bound score, and classifying, via a detection layer, the object in the image.

20 Claims, 7 Drawing Sheets

| | CONFIDENCE SCORE | SOFTMAX SCORE |
|---|---|---|
| BACKGROUND | 42 | 0.04 |
| Obj-Class0 | 45 | 0.82 |
| Obj-Class1 | 40 | 0.01 |
| Obj-Class2 | 41 | 0.02 |
| Obj-Class3 | 43 | 0.11 |
| Obj-Class4 | 39 | 0.00 |
| SOFTMAX UPPER-BOUND | | 0.94 |

EFFICIENT OBJECT DETECTION USING DEEP LEARNING TECHNIQUES

CROSS-REFERENCE TO RELATED APPLICATION

This application hereby claims the benefit of and priority to Indian Provisional Patent Application Number 202041049581, filed Nov. 12, 2020, titled "EFFICIENT DETECTION LAYER FOR DEEP LEARNING BASED OBJECT DETECTORS," and which is hereby incorporated by reference in their entirety.

TECHNICAL FIELD

Various embodiments of the present technology relate to neural networks and object detection, and more specifically, to reducing computational analysis required to detect objects in image data via neural networks.

BACKGROUND

Deep learning based object detection is the default choice for multi-class object detection. Such techniques include Single Shot Detector (SSD), Retina-Net, Yolo, and more. Typically, series of convolution layers generate bounding box parameters and multi-scale features to measure confidence levels of object classifications, which can further be processed by a detection layer. Bounding box parameters are generated for corresponding points and locations of an image. These parameters may be generated with multiple resolutions (i.e., scale/head) lower than original image resolution to assist in multi-scale object detection. Different features are generated for anchor boxes at varying scales.

Following the convolution layers, detection layers compute scores for classifications of objects and bounding boxes for all scales. While convolution layers are executed on deep learning hardware accelerators with high-compute capabilities, detection layers are executed on vector processors (e.g., Digital Signal Processor (DSP), which have lesser compute capability compared to deep learning hardware accelerators. Although the total amount of operations performed in a detection layer is lower compared to convolution layers, the processing time required to complete the detection layer operations accounts for a significant amount of the overall execution time of the complete object detection process (including convolution layers).

What is needed is a solution to reduce the number of operations performed in the detection layer, and ultimately, a reduction to the overall execution time for object detection. At activation layers, typical solutions perform operations (i.e., decoding) for each anchor box, scale, and object classification. Further, bounding box parameters for each location are decoded as well to bring the image into its original resolution. These steps alone require compute-intensive operations that account for much processing time. The disclosure herein reduces the number of operations such as these to decrease the detection layer processing on a DSP, for example.

SUMMARY

Disclosed herein are improvements to object detection using neural networks and deep learning techniques that reduce computational analysis at a detection layer. Neural networks can identify objects within an image, use activation functions to score and predict classifications of the image, and process the classifications to detect a type of object. While the processing of image data can be complex and time-consuming, a method disclosed herein can utilize simplified operations to filter out data points prior to processing at the detection layer.

In an embodiment of the present technology, a method is disclosed and comprises determining, via a convolution neural network, at least a classification of an image, wherein the classification corresponds to an object in the image and comprises location vectors corresponding to pixels of the image. The method also comprises obtaining a confidence level, wherein the confidence level represents a probability of the object being present at the location vector, and calculating an upper-bound score based at least on the confidence level for at least a location vector of the location vectors. The method further comprises performing an activation function on the upper-bound score, and classifying, via a detection layer, the object in the image for at least an upper-bound score based at least on the confidence level.

This Overview is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
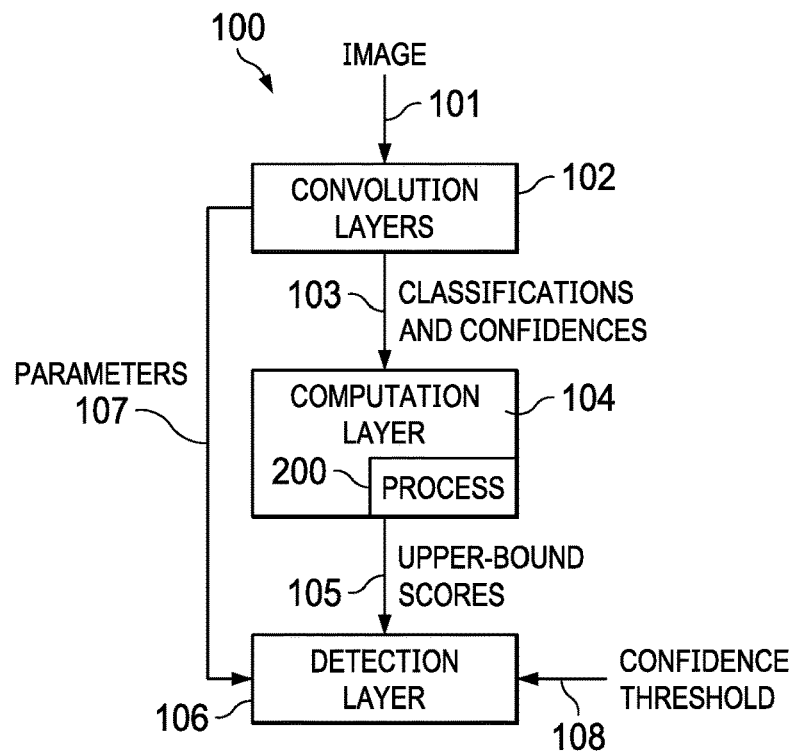
FIG. 1 illustrates an exemplary operating architecture employed to perform object detection in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to object detection using machine learning techniques. More specifically, some embodiments relate to improved post-processing in a detection layer and computational analysis of location vectors in an image to detect one or more objects in the image. For instance, a method is disclosed and comprises determining, via a convolution neural network, at least a classification of an image, wherein the classification corresponds to an object in the image and comprises location vectors corresponding to pixels of the image. The method also comprises, for at least a location vector of the location vectors, obtaining a confidence level, wherein the confidence level represents a probability of the object being present at the location vector, and calculating an upper-bound score based at least on the confidence level. The method further comprises, for at least an upper-bound score based at least on the confidence level, performing an activation function on the upper-bound score, and classifying, via a detection layer, the object in the image.

In another embodiment, a computing apparatus is provided. The computing apparatus comprises one or more computer-readable storage media, a processing system operatively coupled with the one or more computer-readable storage media, and program instructions stored on the one or more computer-readable storage media that, based on being read and executed by the processing system, direct the computing apparatus to perform various functions. In such an embodiment, the program instructions direct the computing apparatus to at least determine, via a convolution neural network, at least a classification of an image, wherein the classification corresponds to an object in the image and comprises location vectors corresponding to pixels of the image. The program instructions further direct the computing apparatus to, for at least a location vector of the location vectors, obtain a confidence level, wherein the confidence level represents a probability of the object being present at the location vector, and calculate an upper-bound score based at least on the confidence level. Then, the program instructions direct the computing apparatus to, for at least an upper-bound score based at least on the confidence level, perform an activation function on the upper-bound score, and classify, via a detection layer, the object in the image.

In yet another embodiment, one or more computer-readable storage media have program instructions stored thereon to operate an object detection engine. The program instructions, when read and executed by a processing system, direct the processing system to at least determine, via a convolution neural network, at least a classification of an image, wherein the classification corresponds to an object in the image and comprises location vectors corresponding to pixels of the image; for at least a location vector of the location vectors, obtain a confidence level, wherein the confidence level represents a probability of the object being present at the location vector, and calculate an upper-bound score based at least on the confidence level; and for at least an upper-bound score based at least on the confidence level, perform an activation function on the upper-bound score, and classify, via a detection layer, the object in the image.

Advantageously, by utilizing an upper-bound computation for object classification and confidence scoring, a reduction in compute complexity can be achieved. Further, by performing activation functions on a selection of the upper-bound computation scores, overall object detection process complexity and time-consumption can be reduced at least at the detection layer which may improve performance when using a DSP, for example.

Turning now to the Figures, FIG. 1 illustrates an exemplary operating architecture employed to perform object detection in accordance with some embodiments of the present technology. FIG. 1 includes operating architecture 100, which further includes convolution layers 102, computation layer 104, and detection layer 106. Convolution layers 102 intake image 101 and provide classifications and confidences 103 to activation layer 104 and parameters 107 to detection layer 106. Computation layer 104 can perform process 200, which allows computation layer 104 to generate upper-bound score 105 and provide the score to detection layer 106. Along with parameters 107, detection layer receives confidence threshold 108 to determine an output or classification.

In operation, image 101 can be analyzed by one or more of convolution layers 102 to extrapolate data from image 101 and to begin classifying objects within image 101 via deep learning processes. Image 101 can comprise one or more objects, a background scene, and other objects or environments. Convolution layers 102 can comprise trained machine learning algorithms configured to identify certain objects. For example, convolution layers 102 can be trained to spot cats and/or dogs, among other objects, within image 101. Upon reading image data of image 101, convolution layers 102 can generate parameters 107, which may include anchor boxes, bounding boxes, box parameter features, aspect ratios of a probable object, scales or resolutions of image 101 and/or of objects, and the like. Specifically, convolution layers 102 can create anchor boxes around objects and potential objects that the convolution layers 102 are trained to detect. Anchor boxes can be created at a specific scale to alleviate aspect ratio issues of probable objects detected at given scales. Using the preceding example, convolution layers 102 can use anchor boxes to outline what it projects to be a cat or dog in image 101. Then, bounding boxes can be created with bounding box parameters and features that align with the anchor boxes. The bounding boxes can correspond to location vectors, or regions, within image 101. At a more granular level, the location vectors can comprise one or more pixels of image 101, each which can be defined within parameters 107.

After convolution layers 102 generate anchor boxes and bounding boxes around each object to be classified, convolution layers 102 determine classifications and confidences 103 for image 101. For instance, image 101 can contain a dog, a cat, and background scenery. As such, convolution layers 102 produce a classification for each object (i.e., dog, cat, background) identified. Further, convolution layers 102 generate confidence scores pertaining to the probability or likelihood that each of the identified objects are present at various locations in image 101. In various embodiments, convolution layers 102 provides a confidence score for each location vector or region of image 101. Because image 101 can be broken into many location vectors, each classification can comprise a confidence score for each location vector. In other embodiments, convolution layers 102 may assign confidence scores to only areas where an anchor box and bounding box outline a probable object in image 101. Nonetheless, confidence scores may be higher for classifications of objects very likely to be present, lower for objects less likely to be present, or some other score depending on image 101. Then, convolution layers 102 can provide both classifications and confidences 103 and parameters 107 downstream to computation layer 104 and detection layer 106, respectively.

Next, computation layer 104 is configured to perform computations using classifications and confidences 103. Computation layer 104 may operate process 200, which can be executed on software, hardware, or some combination thereof. Further, it may be appreciated that computation layer 104 can be run as part of detection layer 106 or it can operate independently. In an embodiment wherein a cat and dog are present in image 101, a classification for the cat may have high confidence scores in some regions or location vectors of image 101, but low confidence scores where a cat is likely not present or where the dog is present but not the cat. Likewise, the classification for the dog may also have corresponding confidence scores based on its location in image 101. Using classifications and confidences 103, computation layer 104 can perform an upper-bound computation on the location vectors for both the cat and dog classifications. The upper-bound computation may refer to a mathematical computation to determine a score based on the confidence scores at each location vector. Computation layer 104 can then provide upper-bound scores 105 pertaining to the location vectors of the classifications to detection layer 106.

Detection layer 106 receives upper-bound scores 105, parameters 107, and a confidence threshold 108 to generate an output with respect to image 101 and its objects. In some embodiments, detection layer 106 first compares upper-bound scores 105 with the confidence threshold 108. The confidence threshold 108 can represent a value determined by a computing device or user to filter out confidence scores or upper-bound scores below the threshold. In effect, this can reduce the amount of location vectors needed to be processed by detection layer 106 to classify or identify objects in image 101. For upper-bound scores 105 above confidence threshold 108, detection layer 106 can perform an activation function on those scores. In some instances, the activation function is a Softmax operation, while in other instances, it can be a Sigmoid operation. Alternatively, other activation functions can be used. Detection layer 106 can next decode parameters 107 to identify and rectify anchor boxes, bounding boxes, and other features associated with image 101. Then, detection layer 106 uses the post-activation function scores of the classifications and their respective location vectors, and it uses decoded parameters 107 to detect, identify, and/or classify the objects in image 101 using deep learning techniques, such as non-maxima suppression.

It may be appreciated by one skilled in the art that detection layer 106 can be executed on hardware, software, or any combination thereof, such as a one or more vector processors (i.e., Digital Signal Processor (DSP)). Further, it may be appreciated that fewer exponent operations are required to calculate upper-bound scores 105, thus, reducing the processing capacity required by a vector processor to perform object detection.

Figure 2:
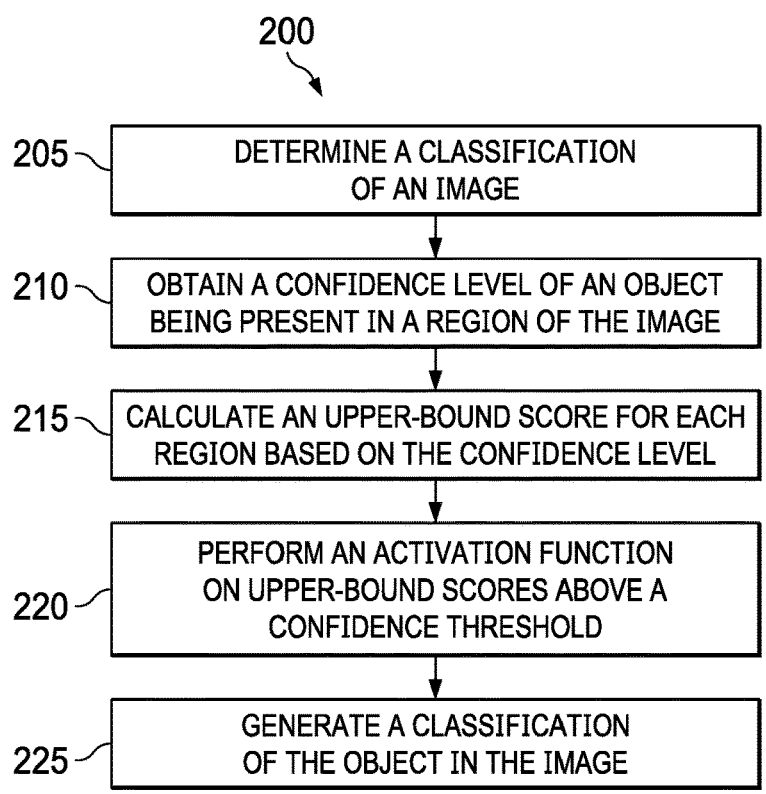
FIG. 2 illustrates a series of steps for detecting objects in an image in accordance with some embodiments of the present technology.

FIG. 2 illustrates a series of steps for detecting objects in an image in accordance with some embodiments of the present technology. FIG. 2 includes process 200, each operation noted parenthetically in the discussion below and which reference elements of FIG. 1. It may be appreciated that process 200 can be implemented on software, hardware, or any combination thereof. For example, process 200 can be executed on or by computation layer 104 of FIG. 1.

In operation 205, a computing apparatus determines (205), via a convolution neural network or convolution layers 102, at least a classification of an image 101, wherein the classification corresponds to an object in the image 101 and comprises location vectors corresponding to the pixels of the image. By way of example, image 101 can include various objects, background scenery, and the like. Convolution layers 102 can represent a trained machine learning program calibrated to detect at least one object, which may be present in image 101. As convolution layers 102 analyze image data from image 101, they can generate classifications for each object detected in the image. The background scenery can be captured as a classification as well. Each classification generated can comprise location vectors corresponding to regions of image 101, and each region may contain one or more pixels of image 101. Convolution layers 102 can further outline or produce anchor boxes and bounding boxes around the objects initially predicted to be present in image 101. The anchor boxes and bounding boxes can comprise one or more location vectors within them along with other features and parameters, including scale and aspect ratio of the image and/or objects, sizes of the boxes, locations of the boxes, and the like.

In operation 210, the computing apparatus obtains (210), for at least a location vector of the location vectors, a confidence level or score, wherein the confidence level represents a probability of the object being present at the location vector. For example, for an image 101 containing a cat, dog, and background scenery, the computing apparatus can predict a value for how likely it is that the dog appears in each region of image 101, how likely it is that the cat appears in each region, and how prevalent the background scenery is in the image. Accordingly, the confidence level may be higher for location vectors corresponding to the region where each object is actually located. The computing apparatus can do this for each classification of image 101 and each location vector within the classification.

In operation 215, the computing apparatus calculates (215), for at least a location vector of the location vectors, an upper-bound score 105 based at least on the confidence level. In various embodiments, after the classifications of image 101 are scored with respect to confidence level, the computing apparatus can use each confidence score generated by convolution layers 102 to calculate upper-bound scores 105. The upper-bound scores 105 may be calculated using exponent operations on confidence levels of classifications. It follows that an upper-bound score can be calculated for each confidence score in each classification because a classification comprises multiple location vectors and each location vector has a confidence score associated with it.

In operation 220, the computing apparatus performs (220), for at least an upper-bound score 105 above a confidence threshold 108, an activation function on the upper-bound score 105. In some embodiments, a user inputs confidence threshold 108, which can be used to filter out low-probability values and avoid processing of data with lower likelihood that an object is present in image 101. In other embodiments, the computing apparatus can generate confidence threshold 108. The computing apparatus can compare the upper-bound scores 105 with confidence threshold 108 to determine which upper-bound scores 105 to filter out. For each of upper-bound scores 105 above confidence threshold 108, an activation function, such as a Softmax operation, a Sigmoid operation, or some other activation operation can be performed on the upper-bound scores 105. In various embodiments, the upper-bound scores 105 above confidence threshold 108 are fewer than the total amount of upper-bound scores 105.

In operation 225, the computing apparatus generates (225), for at least the upper-bound score 105 above the confidence threshold 108, a classification of the object in the image via a detection layer 106. Following the activation function processing, the activated scores from each classification can further be compared to confidence threshold 108. Then, the activated scores can be processed in a detection layer 106 to detect and classify the object in image 106. The detection layer 106 can decode anchor boxes and bounding boxes created by convolution layers 102, perform non-maxima suppression, and provide an output for each classification identified in the image 101. The output for each classification can include an indication of what the object is (i.e., whether the confidence prediction is correct).

Figure 3:
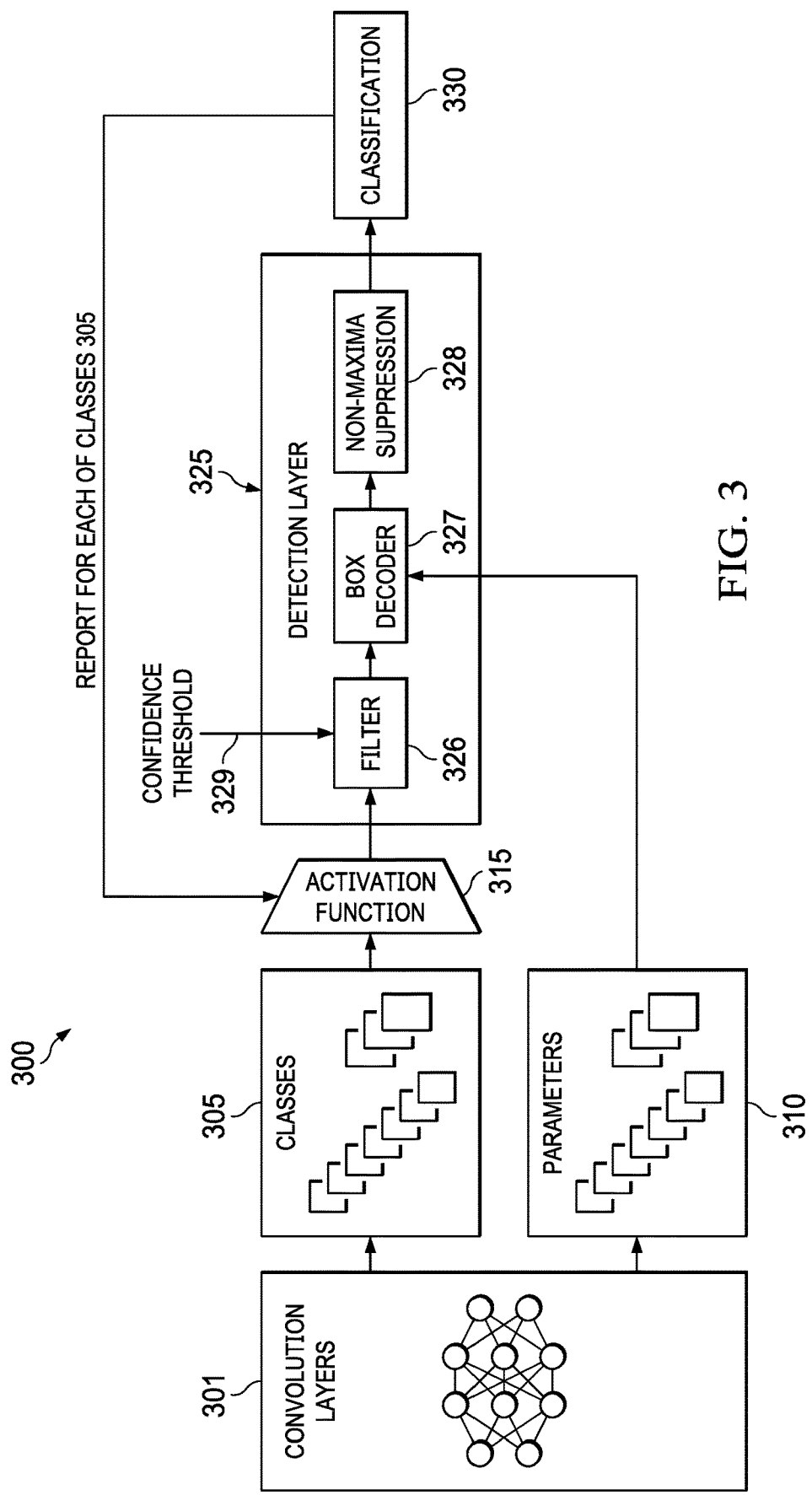
FIG. 3 illustrates an exemplary operating environment for detecting objects in an image using neural networks in accordance with some embodiments of the present technology.

FIG. 3 illustrates an exemplary operating environment for detecting objects in an image using neural networks and/or layers in accordance with some embodiments of the present technology. FIG. 3 includes operating environment 300, which further includes convolution layers 301, classes 305, parameters 310, activation function and filter 315, detection layer 325, and classification output 330. Detection layer 325 is fed by activation function 315 and parameters 310, and it includes filter 326, box decoder 327, non-maxima suppression (NMS) 328 to process image data.

In operation, convolution layers 301 comprise neural network layers and hidden activation layers configured to at least detect objects in an image, categorize detected objects into classes 305, and define parameters 310 corresponding to the image, classes 305, and the like. In various embodiments, convolution layers 301 identify regions of the image corresponding to pixels to create a feature map on the image. Convolution layers 301 then detect objects in the image and outline each object with an anchor box and bounding box that encloses the object and provides at least a location for each object, among other information. The size, location, scale, and the like of the anchor box make up, at least in part, parameters 310.

Convolution layers 301 also identify classes 305 pertaining to the image, which comprise one or more classifications of objects potentially detected in the image. The classifications can include any type of object, such as animals, humans, inanimate objects, or any combination thereof. For example, in an image containing a human and a dog, convolution layers 301 can create anchor boxes around both the human and the dog and create two classifications, one for each object, encapsulated in one or more of classes 305. Then, convolution layers 301 can assign confidence scores to each classification. The confidence scores refer to a probability that a given object appears in regions of the image. The regions can correspond to pixels of the image, and each region can be assigned a probability. Thus, each classification in classes 305 can have multiple confidence scores associated with the classification. Accordingly, the higher the confidence score, the more likely that the object of classes 305 appears in a certain region of the image.

Classes 305 then pass through activation function and filter 315 where mathematic computations are performed on the confidence scores of the classifications of classes 305. In various embodiments, these computations are referred to as an upper-bound score. The upper-bound score takes into consideration at least the maximum confidence score of an object, the minimum confidence score of the object, and the confidence score of the background scenery of the image. The upper-bound score for each classification is then input into detection layer 325.

First, detection layer 325 includes filter 326 configured to compare the upper-bound scored produced by activation function 315 with a confidence threshold 329. The confidence threshold 329 can be set by a user or a computing device and dictates a level of confidence that may be required in order for an object detector to classify an object. In various embodiments, the confidence threshold 329 can be set and/or adjusted based on a quality or resolution of an image. For the regions of the image with upper-bound scores above the confidence threshold 329, the anchor boxes associated with those regions and parameters 310 are fed into box decoder 327 to process and scale the image data, among other functions to produce decoded image data. Then, detection layer 325 can pass the decoded image data, anchor box data, and parameters 310 to NMS 328 to locate the specific region or location and anchor boxes the object is located in within the image. NMS 328 can compare each anchor box and determine which box contains most of the object or which box has the highest confidence. In several embodiments, multiple anchor boxes can have confidence scores pertaining to the presence of an object. NMS 328 can prune a majority of the multiple anchor boxes selected by identifying the one(s) that most likely contain the object, or in other words, that has/have the highest confidence among the multiple anchor boxes. Then, using the remaining anchor box(es), detection layer 325 can produce a classification 330 of an object in the image. For the sake of brevity, the technical features of NMS 328 are not discussed as they are well known in the industry.

It may be appreciated by one skilled in the art that detection layer 325 can repeat each filtering, decoding, and processing step for each object classified in classes 305. Using the preceding example, detection layer 325 may first process the image data and upper-bound scores for the human detected in the image, then it can repeat the steps to classify the dog detected in the image. However, the order in which detection layer 325 processes each class of classes 305 is unimportant.

Figure 4:
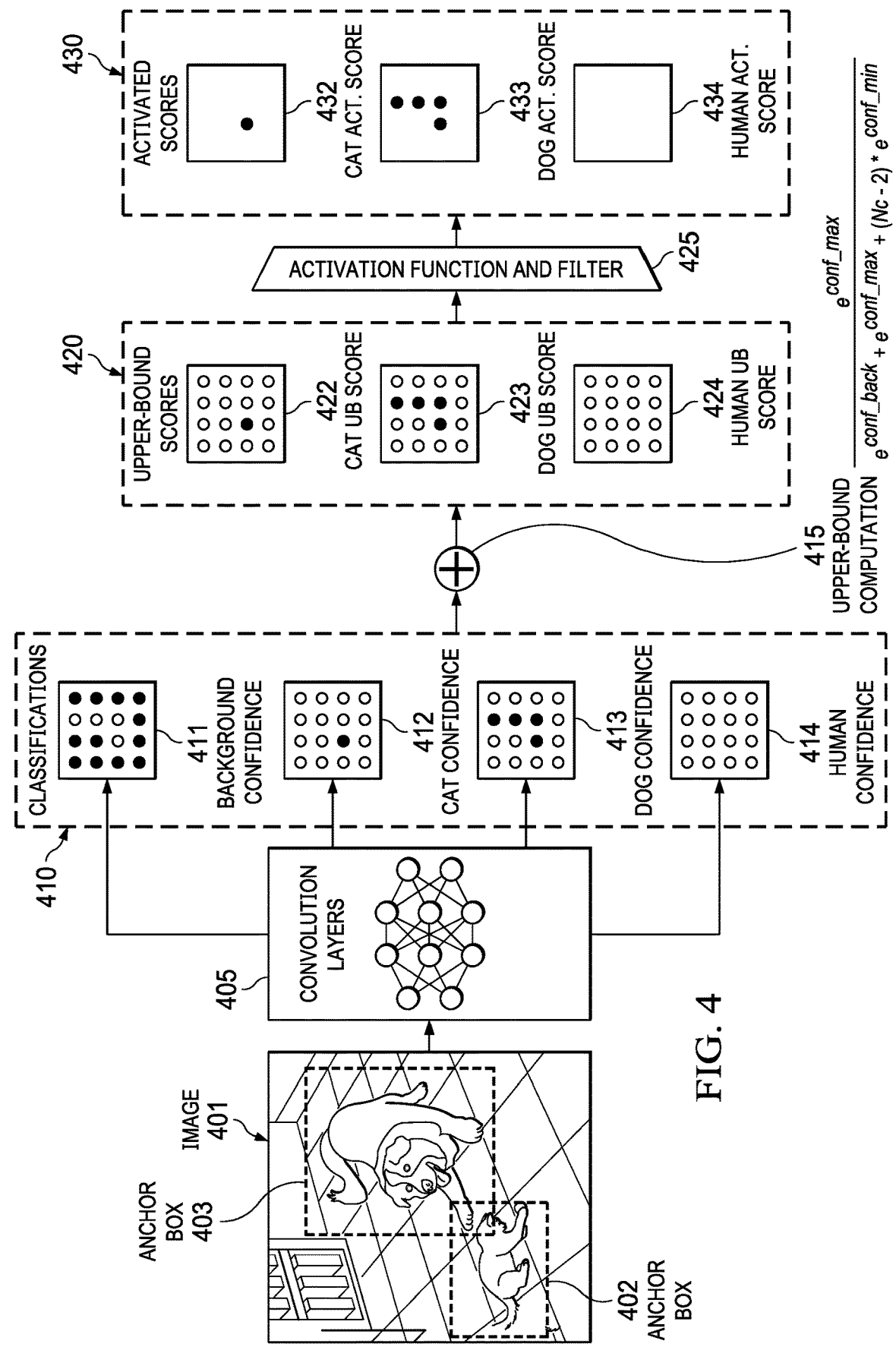
FIG. 4 is an example demonstrating object detection, classification, and confidence scoring in accordance with some embodiments of the present technology.

FIG. 4 is an example demonstrating object detection, classification, and confidence scoring in accordance with some embodiments of the present technology. FIG. 4 includes operating environment 400, which further includes image 401, convolution layers 405, classifications 410, upper-bound computation 415, upper-bound scores 420, activation function and filter 425, and activated scores 430. Image 401 depicts a cat and dog in an image enveloped by anchor box 402 and anchor box 403. Classifications 410 comprise background confidence 411, cat confidence 412, dog confidence 413, and human confidence 414, which can be transformed into upper-bound scores 420, and further filtered into activated scores 430. Upper-bound scores 420 include cat upper-bound (UB) score 422, dog UB score 423, and human UB score 424. Activated scores 430 include cat activated score 432, dog activated score 433, and human activated score 434.

As illustrated in operating environment 400, image 401 depicts a cat and a dog playing on the floor near a bookshelf. The cat can be outlined by anchor box 402 while the dog is outlined by anchor box 403. In some embodiments, both anchor boxes may overlap each other given the closeness of objects in image 401. Image 401 is fed to convolution layers 405 to classify these objects in image 401 and provide confidence scores to predict at least a location of the objects, type of object, and likelihood of presence.

Convolution layers 405 can embody a convolution neural network (CNN) configured to analyze visual data for object detection processes. For example, convolution layers 405 may be trained to detect dogs or cats from images. Convolution layers 405 determine classifications 410 which include objects, environments, and/or scenery in image 401. Classifications 410 include background confidence 411, cat confidence 412, dog confidence 413, and human confidence 414. Each of classifications 410 identifies locations of presence and probabilities of presence of the object, environment, and/or scenery. For instance, convolution layers 405 predict that a majority of image 401 contains some background. Thus, it follows that convolution layers 405 assigns a confidence score to each location that it identifies as background, while areas not considered background (i.e., where an object covers up any background) can have a lower score relative to areas of background presence. On the other hand, convolution layers 405 may not provide any confidence score for a human because no human appears in image 401. For a dog and cat, convolution layers 405 can predict the highest confidence scores for cat confidence 412 and dog confidence 413 based at least on anchor boxes 402 and 403, respectively. Alternatively, convolution layers 405 can generate confidence scores independently of anchor box positioning. Given the closeness of the cat and dog in image 401, convolution layers 405 may predict a relatively high confidence score at the overlapping positions for both the cat and dog.

Next, an upper-bound computation 415 can be performed on each of classifications 410 to create upper-bound scores 420. Upper-bound computation 415 can be expressed as follows:

$$\frac{e^{conf\_max}}{e^{conf\_back} + e^{conf\_max} + (Nc - 2) * e^{conf\_min}}$$

Upper-bound computation 415 includes confidence maximum (i.e., conf_max), which refers to a maximum confidence score at a given location across classifications 410 excluding background confidence 411. Likewise, confidence minimum (i.e., conf_min) refers to a minimum confidence score at a given location across classifications 410 excluding background confidence 411. Confidence background (i.e., conf_back) refers to the background confidence 411 score for a given location. The number of classes (i.e., Nc) refers to the number of classes (i.e., classifications 410) to be analyzed. By further reducing the terms and simplifying the equation, the upper-bound computation 415 can be expressed as:

$$e^{conf\_back-conf\_max} + (Nc-2) * e^{conf\_min-conf\_max}$$

As a result of using upper-bound computation 415, only two exponent operations are required for each computation. The total number of exponent operations required to analyze a dataset for image 401 may be the number of location vectors times two. In the illustration shown in operating environment 400, each of classifications 410 includes a 4×4 mapping with sixteen location vectors, thus, thirty-two exponent operations may be required to calculate upper-bound scores 420 for a single class or classifications 410. As a result, upper-bound computation 415 can be applied upon each location vector of classifications 410 to produce cat UB score 422, dog UB score 423, and human UB score 424, respectively.

After upper-bound scores 420 are calculated for each of classifications 410, activation function and filter 425 can be applied to a select number of location vectors to produce activated scores 430. Activation function and filter 425 can compare each of score of upper-bound scores 420 to a threshold value. Any scores of upper-bound scores 420 that do not meet or exceed the threshold can be filtered out to reduce the processing capacity required to reach activated scores 430. For the scores that do meet or exceed the threshold, an activation function, such as Softmax or Sigmoid, can be applied to the remaining scores. For example, for cat UB score 422, activation function and filter 425 may be applied to the dark-circled location vector as convolution layers 405 may have indicated a high level of confidence for that area with respect to other location vectors. Thus, the other location vectors with lower confidence scores, if below the threshold, do not undergo activation function and filter 425.

In various embodiments, the threshold value may represent a probability that an object exists in an image. In other embodiments, a further confidence threshold can be applied to overlapping areas of an image wherein the confidence scores are relatively high in the same location for more than one of classifications 410. It follows that the location vectors with the highest confidence scores can be the values ultimately processed via activation function and filter 425. However, it may be appreciated that not every score input to activation function and filter 425 is necessarily an object sought to be detected by operating environment 400.

Activated scores 430 represent surviving location vectors that may undergo further deep learning processes to classify objects in image 401. In operating environment 400, one location from cat confidence 412 remains, shown in cat activated score 432, while four locations from dog confidence 413 remain, shown in dog activated score 433. It may be noted that the location vector of cat activated score 432 is also processed for dog activated score 433 due to the overlap in anchor boxes and closeness of the cat and dog in image 401. In various embodiments, activated scores 430 are further processed by a detection layer which may be configured to decode anchor boxes, process activated scores 430 via non-maxima suppression, and the like.

Figure 5:
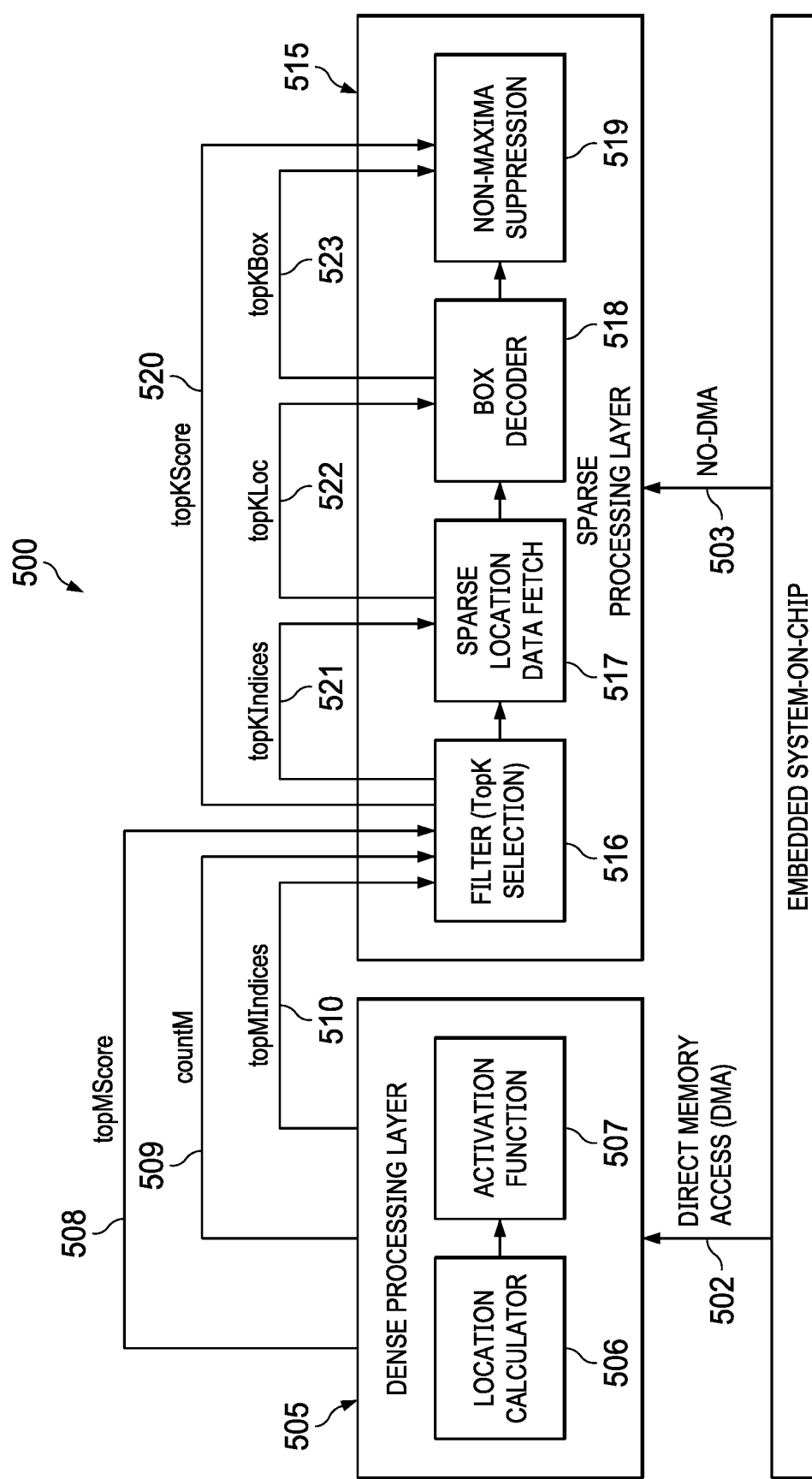
FIG. 5 illustrates an exemplary operating environment for performing object detection processes on a system on a chip (SoC) in accordance with some embodiments of the present technology.

FIG. 5 illustrates an exemplary operating environment for performing object detection processes on a system on a chip (SoC) in accordance with some embodiments of the present technology. FIG. 5 includes operating environment 500, which further includes embedded SoC 501, dense processing layer 505 and sparse processing layer 515, which function together to perform object detection.

Operating environment 500 functions to at least provide improved and organized processing in both dense processing layer 505 and sparse processing layer 515 so that embedded SoC 501 can operate efficiently. Embedded SoC 501 can embody a semiconductor, semiconductor device, computing system or device, or the like. Dense processing layer 505 and sparse processing layer 515 can embody layers or components of embedded SoC 501. Embedded SoC 501 can perform some object detection processes via dense processing layer 505 through direct memory access (DMA) 502, while it can perform other object detection processes via sparse processing layer 515 through no-DMA 503.

Dense processing layer 505 includes location calculator 506 and activation function 507 and may perform operations in object detection that are dense in nature. In various embodiments, single instruction multiple data (SIMD) may be used to execute the operations on dense processing layer 505. Location calculator 506 can first validate location vectors and confidence scores of an image provided by convolution layers (not shown). Location calculator 506 can then compute upper-bound scores on valid location vectors using the confidence scores of each location of the image. Further, location calculator 506 can compare each upper-bound score with a threshold value to filter out scores that do not meet or exceed the threshold before activation function 507 performs its operations on the data. Next, activation function 507 can perform a Softmax, Sigmoid, or other activation layer function on surviving location vectors (i.e., location vectors meeting or exceeding the threshold value) to generate activated scores associated with the image and its corresponding location vectors.

Following both location calculator 506 and activation function 507, dense processing layer 505 may store the processed data in internal memory to subsequently be used by sparse processing layer 515. Alternatively, dense processing layer 505 may nearly immediately communicate the processed data to sparse processing layer 515 without storing it in internal memory. Dense processing layer 505 can communicate the data processed therein to sparse processing layer 515 including topMscore 508, countM 509, and topMindices 510. Each of topMscore 508, countM 509, and topMindices 510 can provide information about the image, location vectors, confidence scores, upper-bound scores, activated scores, and the like.

At sparse processing layer 515, the activated scores and associated data (i.e., topMscore 508, countM 509, and topMindices 510) are first filtered by filter 516. Filter 516 may perform a topK selection process and/or further filter the activated scores on other criteria. Sparse location data fetch 517 can then use topKIndices 521 and the filtered data. Next, box decoder 518 can identify the locations (i.e., topKLoc 522) of anchor boxes and anchor box parameters associated with the image to correlate activated scores with anchor boxes and objects within the anchor boxes. Finally, sparse processing layer 515 can perform non-maxima suppression 519 to prune most of the anchor boxes to find the anchor box that captures the object at the highest confidence level to classify at least an object in the image. In an instance, multiple anchor boxes can overlap a potential object in the image. Non-maxima suppression 519 can be used to determine which anchor box has the highest confidence level of the overlapping anchor boxes and keep only the highest confidence anchor box.

Figure 6:
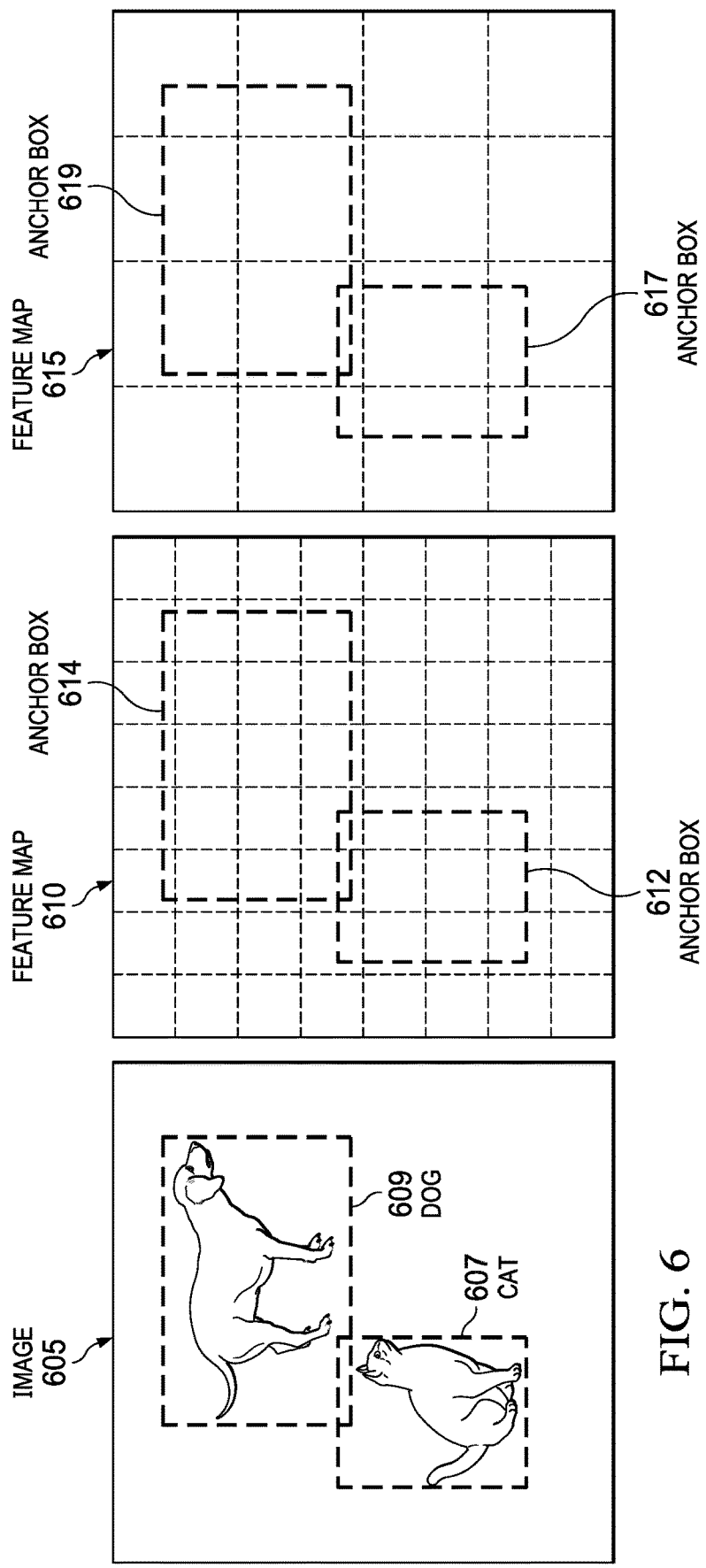
FIG. 6 is an example demonstrating object detection using feature maps in accordance with some embodiments of the present technology.

FIG. 6 is an example demonstrating object detection using feature maps in accordance with some embodiments of the present technology. FIG. 6 includes image 605, feature map 610, and feature map 615. Both feature map 610 and feature map 615 can use anchor boxes 612 and 614, and 617 and 619, respectively, to outline and detect images during object detection processes.

As illustrated in image 605, both a cat 607 and dog 609 are present in the picture. In various embodiments, a neural network, such as a convolution neural network (CNN), can be trained to detect and identify animals including both cats and dogs. As such, the CNN can create feature map 610 which can be overlayed on image 605. Feature map 610 comprises an 8×8 grid with parameters related to image 605 like a scale of the image, location vectors corresponding to regions or groups of pixels within the image, and the like. As a feature map, like feature map 610, is created by the CNN, anchor boxes (i.e., anchor box 612 and 614) can be generated to outline detected and probable objects in image 605. Accordingly, anchor box 612 can create a best fit outline around cat 607 and anchor box 614 can create a best fit outline around dog 609. In some embodiments, there may be overlap between the anchor boxes, which may indicate that the objects are close to each other in the picture. The overlap may also indicate a degree of uncertainty or lack of confidence in the bounds of an object. It may be appreciated that several other anchor boxes may be created for image 605, but only two are shown for simplicity.

Each of anchor box 612 and 614, along with other areas of feature map 610, can comprise confidence scores relating to how confident the CNN is that the outlined object is what it is. An area enclosed within an anchor box may have higher confidence scores with respect to an object than areas outside the anchor box. For example, the location vectors of anchor box 612 may indicate high confidence that cat 607 is likely to be present relative to other areas of feature map 610. Similarly, the location vectors of anchor box 614 may indicate high confidence that dog 609 is likely to be present relative to other areas of feature map 610. Further, in areas where anchor boxes overlap, confidence scores for each object detected may be relatively high.

Feature map 615, like feature map 610, can also be used by a CNN in object detection processes. Feature map 615 illustrates a 4×4 feature map that can be used for images like image 605 at a different scale. In some embodiments, feature map 615 can be used when less precision is required to detect objects, when objects can be more easily identified, or when an object takes up a large amount of space within the image. Anchor boxes 617 and 619 can be used to outline object such as cat 607 and dog 609. Because feature map 615 is a 4×4 mapping, fewer regions can be created by CNN, and thus, fewer location vectors may be assigned to the image and anchor boxes.

Figures 7, 9:
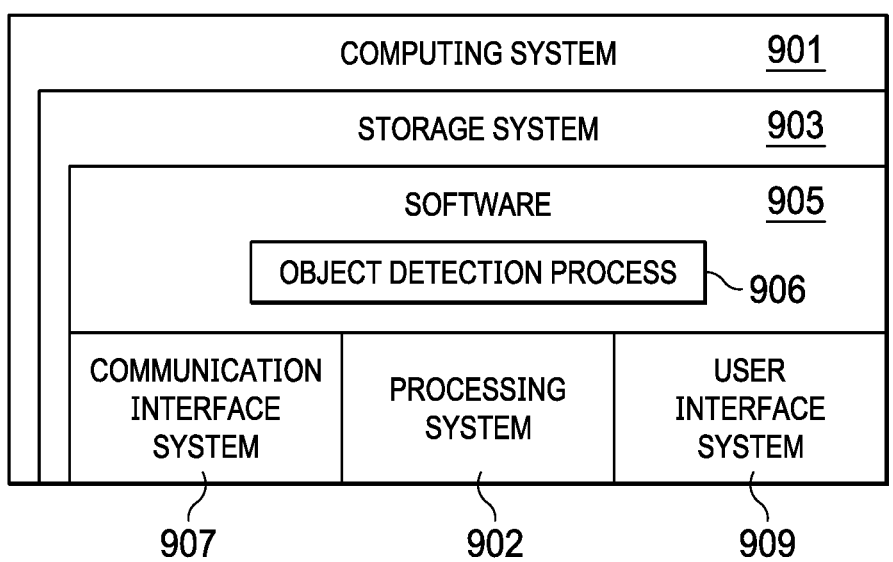
FIG. 7 illustrates an aspect of object detection scoring in accordance with some embodiments of the present technology.
FIG. 9 illustrates a computing device that may be used in accordance with some embodiments of the present technology.

FIG. 7 illustrates an aspect of object detection scoring in accordance with some embodiments of the present technology. FIG. 7 includes aspect 701, which demonstrates sample data and how upper-bound scoring compares to traditional confidence and Softmax scoring.

Aspect 701 provides a scoring table indicating a confidence score 705 and a Softmax score 710 of a background and five object classifications (obj-class0, obj-class1, obj-class2, obj-class3, and obj-class4). In various embodiments, these numbers are generated by convolution neural network or convolution layers configured to detect objects in an image and predict how probable it is that the object is present within the image. Accordingly, obj-class0 has the highest confidence score 705, and consequently the highest Softmax score 710, out of each object and background in the image. Using traditional object detection methods, at this point, a Softmax activation function may be performed on each confidence score 705 to determine each Softmax score 710 requiring high processing capacity.

However, in various embodiments of the disclosed technology, using a Softmax upper-bound activation function, it can be determined that Softmax upper-bound score 715 is greater than the maximum Softmax score 710 (i.e., obj-class0). The Softmax upper-bound activation function can utilize the maximum of confidence score 705, the minimum of confidence score 705, and the background score of confidence score 705. As such, the equation for determining Softmax upper-bound score 715 can be expressed as:

$$\frac{e^{conf\_max}}{e^{conf\_back} + e^{conf\_max} + (N_C - 2) * e^{conf\_min}}$$

By rearranging the terms of the equation, it can further be simplified and expressed as:

$$e^{conf\_back-conf\_max} + (N_C-2) * e^{conf\_min-conf\_max}$$

Thus, only two exponent equations are required to determine Softmax upper-bound score 715. Rather than performing a Softmax operation on each of confidence scores 705, the Softmax upper-bound activation function can be performed to calculate a different set of values. This set of values can further be filtered to find fewer values to perform the Softmax activation function on, reducing the processing capacity required.

Figure 8:
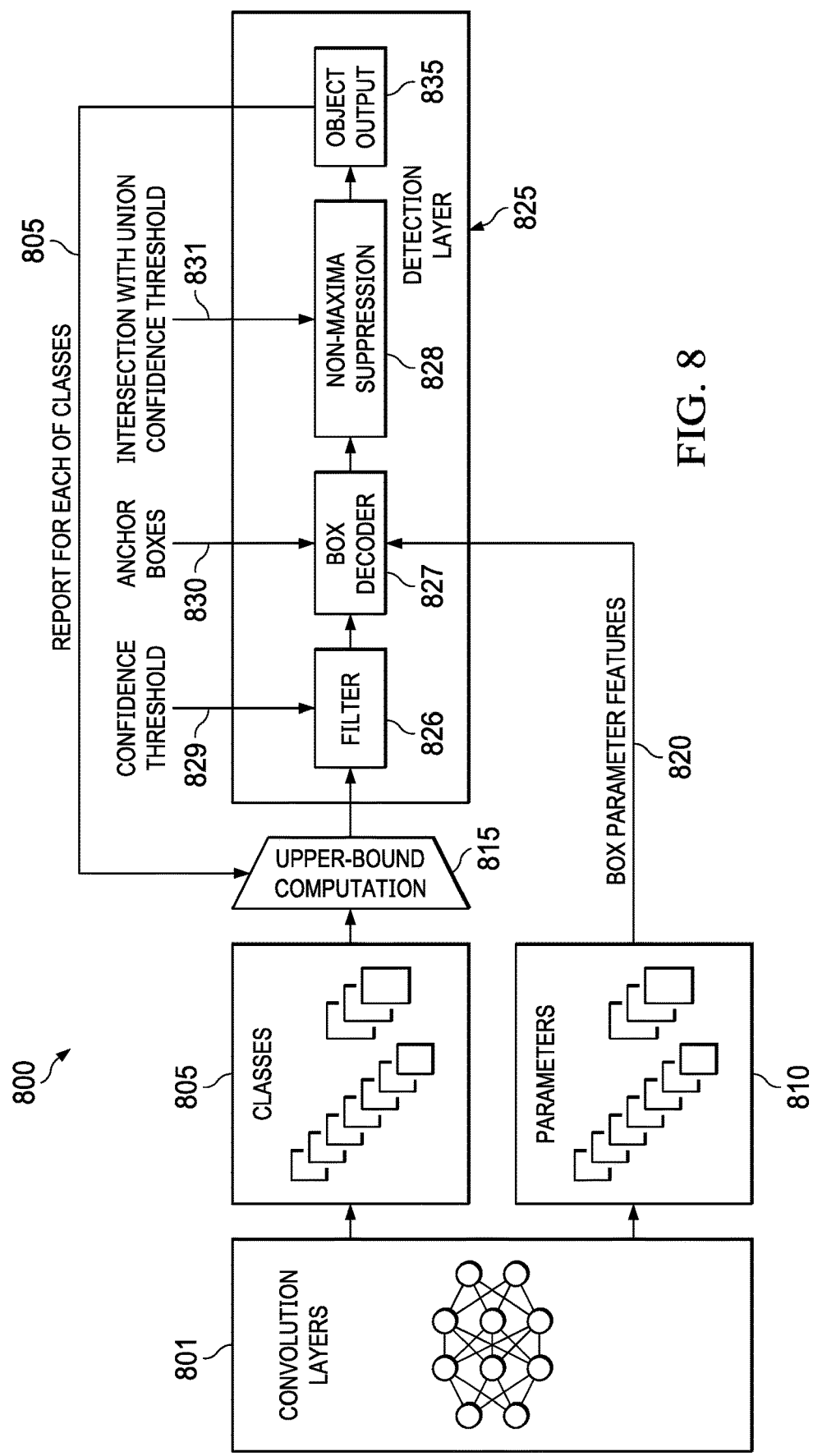
FIG. 8 illustrates an exemplary operating environment for detecting objects in an image using neural networks in accordance with some embodiments of the present technology.

FIG. 8 illustrates an exemplary operating environment for detecting objects in an image using neural networks in accordance with some embodiments of the present technology. FIG. 8 includes operating environment 800, which further includes convolution layers 801, classes 805, parameters 810, upper-bound computation 815, and detection layer 825. Detection layer 825 is fed by upper-bound computation 815, box parameter features 820, confidence threshold 829, anchor boxes 830, intersection with union confidence threshold (IOU confidence threshold) 831, and it includes filter 826, box decoder 827, non-maxima suppression (NMS) 828 to process image data and provide object output 835.

In operation, convolution layers 801 comprise neural network layers and hidden activation layers configured to detect objects in an image, categorize each detected object into classes 805, and define parameters 810 corresponding to the image, classes 805, and the like. In various embodiments, convolution layers 801 identify regions of the image corresponding to pixels to create a feature map on the image. Convolution layers 801 then detect objects in the image and outline each object with one or more anchor boxes that enclose the object and provide locations for each object. The size, location, scale, and the like of the anchor boxes make up, at least in part, parameters 810 and box parameter features 820.

Convolution layers 801 also identify classes 805 pertaining to the image, which comprise one or more classifications of objects potentially detected in the image. The classifications can include animals, humans, inanimate objects, or any combination thereof. For example, in an image containing a human and a dog, convolution layers 801 can create anchor boxes around both the human and the dog and create two classifications encapsulated in classes 805. Then, convolution layers 801 can assign confidence scores to each classification. The confidence scores refer to a probability that a given object appears in regions of the image. The regions can correspond to pixels of the image, and each region can be assigned a probability. Thus, each classification in classes 805 can have multiple confidence scores. Accordingly, the higher the confidence score, the more likely that the object of classes 805 appears in a certain region of the image.

Classes 805 then pass through upper-bound computation 815 where mathematic computations are performed on the confidence scores of the classifications of classes 805. In various embodiments, these computations are referred to as an upper-bound score. The upper-bound score takes into consideration at least the maximum confidence score of an object, the minimum confidence score of the object, and the confidence score of the background scenery of the image. The upper-bound score for each classification is then input into detection layer 825.

First, detection layer 825 includes filter 826 configured to compare the upper-bound scores produced by upper-bound computation 815 with a confidence threshold 829. The confidence threshold 829 can be set by a user or a computing device, and it can dictate how much image data may be processed for object detection. For the regions of the image with upper-bound scores above the confidence threshold 829, the anchor boxes associated with those regions and parameters 810 and box parameter features 820 are fed into box decoder 827 to process and scale the image data, among other functions. Further, anchor boxes 830 are provided to box decoder 827 to align anchor boxes used to outline objects in the image with parameters 810 and box parameter features 820. Then, detection layer 825 can pass the decoded image data, anchor box data, parameters 810, and box parameter features 820 to NMS 828 to locate the specific region and anchor box the object is most likely located in within the image based on the confidence scores. In addition to confidence scores for each of classes 805, NMS 828 can also receive IOU confidence threshold 831, which represents another confidence threshold with respect to overlapping anchor boxes 830. In an instance, IOU confidence threshold 831 can be the same as confidence threshold 829. In other instances, IOU confidence threshold 831 can be different. Regardless, any anchor boxes that do not meet or exceed IOU confidence threshold 831 can be discarded, while the most confidence anchor box(es) can be retained.

As a result, detection layer 825 can produce object output 830 of an object in the image. Object output 830 may represent a classification of an object, a name or type of an object, or the like, related to objects within the image. It may be appreciated by one skilled in the art that detection layer 825 can repeat each filtering, decoding, and processing step for each object classified in classes 805, if multiple objects are detected by convolution layers 801. Using the preceding example of an image containing both a human and a dog, detection layer 825 may first process the image data and upper-bound scores for the human detected in the image, then it can repeat the steps to classify the dog detected in the image. However, the order in which detection layer 825 processes each class of classes 805 is unimportant.

FIG. 9 illustrates computing system 901 to perform object detection according to an implementation of the present technology. Computing system 901 is representative of any system or collection of systems with which the various operational architectures, processes, scenarios, and sequences disclosed herein for object detection may be employed. Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909 (optional). Processing system 902 is operatively coupled with storage system 903, communication interface system 907, and user interface system 909. Computing system 901 may be representative of a cloud computing device, distributed computing device, or the like.

Processing system 902 loads and executes software 905 from storage system 903. Software 905 includes and implements object detection process 906, which is representative of any of the object detection, activation, and detection layer processes discussed with respect to the preceding Figures. When executed by processing system 902 to provide object detection functions, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including object detection process 906) may be implemented in program instructions and among other functions may, when executed by processing system 902, direct processing system 902 to operate as described with respect to the various operational scenarios, sequences, and processes illustrated herein. For example, software 905 may include program instructions for implementing an object detection engine for digital twin systems as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to provide object detection optimization as described herein. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of a neural network, layer, and/or object detection engine, it should be understood that the object detection systems and methods described herein are not limited to such embodiments and may apply to a variety of other neural networks, machine learning application, and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method, comprising:
   determining, using a device based on a machine learning model, for each location of a set of locations in an image, a set of confidence levels corresponding to a set of objects, wherein the set of confidence levels each represents a probability of presence of a respective one of the set of objects at the location;
   determining, using the device, for each location of the set of locations, an upper-bound score based on the set of confidence levels at the location;
   determining, using the device, a subset of the set of locations based on the upper-bound scores of the set of locations and a confidence threshold; and
   detecting, using the device, the set of objects in the image based on the subset of locations.

2. The method of claim 1, wherein the machine learning model comprises a convolutional neural network model.

3. The method of claim 2, wherein the convolutional neural network model has been trained prior to determining the set of confidence levels.

4. The method of claim 1, wherein the set of objects includes a background of the image, and the method comprises:
   determining, for each location of the set of locations, a confidence maximum based on identifying a maximum confidence level out of the set of confidence levels, excluding the confidence level of the background, at the location; and
   determining a confidence minimum based on identifying a minimum confidence level out of the set of confidence levels, excluding the confidence level of the background, at the location.

5. The method of claim 4, wherein determining, for each location of the set of locations, the upper-bound score comprises determining the upper-bound score based on an equation of:

$$\text{upper-bound score} = e^{conf.back-conf.max} + (N_c-2) \times e^{conf.min-conf.max.back}$$

represents the confidence level of the background at the location, $e^{conf.max}$ represents the confidence maximum at the location, $e^{conf.min}$ represents the confidence minimum at the location, and Nc represents a number of objects in the set of objects.

6. The method of claim 1, wherein determining the subset of locations comprising selecting the subset of locations out of the set of locations based on comparison of the upper-bound scores of the set of locations to the confidence threshold.

7. The method of claim 1, wherein detecting the set of objects in the image comprises:
   determining activated scores of the subset of locations based on an activation function; and
   detecting the set of objects in the image based on the activated scores.

8. The method of claim 7, wherein the activation function is a Softmax function or a Sigmoid function.

9. The method of claim 1, wherein the set of locations is associated with a set of location vectors.

10. A system, comprising:
    memory configured to store program instructions; and
    one or more processors configured to execute the program instructions to:
       determine, for each location of a set of locations in an image, a set of confidence levels corresponding to a set of objects, wherein the set of confidence levels each represents a probability of presence of a respective one of the set of objects at the location;
       determine, for each location of the set of locations, an upper-bound score based on the set of confidence levels at the location;
       determine a subset of the set of locations based on the upper-bound scores of the set of locations and a confidence threshold; and
       detect the set of objects in the image based on the subset of locations.

11. The system of claim 10, wherein the one or more processors are configured to execute the program instructions to determine the set of confidence levels based on a machine learning model.

12. The system of claim 11, wherein the machine learning model is a convolutional neural network model.

13. The system of claim 10, wherein the set of objects includes a background of the image, and wherein the one or more processors are configured to execute the program instructions to:
    determine, for each location of the set of locations, a confidence maximum based on identifying a maximum confidence level out of the set of confidence levels, excluding the confidence level of the background, at the location; and
    determine a confidence minimum based on identifying a minimum confidence level out of the set of confidence levels, excluding the confidence level of the background, at the location.

14. The system of claim 13, wherein to determine, for each location of the set of locations, the upper-bound score, the one or more processors are configured to execute the program instructions to determine the upper-bound score based on the confidence level of the background, the confidence maximum, and the confidence maximum at the location.

15. The system of claim 10, wherein to determine the subset of locations, the one or more processors are configured to execute the program instructions to select the subset of locations out of the set of locations based on comparison of the upper-bound scores of the set of locations to the confidence threshold.

16. The system of claim 10, wherein to detect the set of objects in the image, the one or more processors are configured to execute the program instructions to:
    determining activated scores of the subset of locations based on an activation function; and
    detect the set of objects in the image based on the activated scores.

17. A non-transitory computer readable medium storing program instructions that, when executed by one or more processors, cause the one or more processors to:
    determine, using a convolutional neural network model, for each location of a set of locations in an image, a set of confidence levels corresponding to a set of objects, wherein the set of confidence levels each represents a probability of presence of a respective one of the set of objects at the location;
    determine, for each location of the set of locations, an upper-bound score based on the set of confidence levels at the location;
    determine a subset of the set of locations based on the upper-bound scores of the set of locations and a confidence threshold; and
    detect the set of objects in the image based on the subset of locations.

18. The non-transitory computer readable medium of claim 17, wherein:
    the set of objects includes a background;
    the upper-bound score, the program instructions cause the one or more processors to:
       determine, for each location of the set of locations, a confidence maximum based on identifying a maximum confidence level out of the set of confidence levels, excluding the confidence level of the background, at the location;
       determine a confidence minimum based on identifying a minimum confidence level out of the set of confidence levels, excluding the confidence level of the background, at the location; and
       determine, for each location of the set of locations, the upper-bound score based on the confidence level of the background, the confidence maximum, and the confidence minimum at the location.

19. The non-transitory computer readable medium of claim 17, wherein the program instructions cause the one or more processors to determine the subset of locations based on comparison of the upper-bound scores of the set of locations to the confidence threshold.

20. The non-transitory computer readable medium of claim 17, wherein the program instructions cause the one or more processors to:
- perform an activation function on the upper-bound scores of the subset of locations to generate activated scores; and
- detect the set of objects in the image based on the activated scores.

* * * * *